US009792471B1

(12) United States Patent
Lavery (10) Patent No.: US 9,792,471 B1
(45) Date of Patent: Oct. 17, 2017

(54) ARRANGEMENT FOR, AND METHOD OF, OPTIMIZING RADIO FREQUENCY (RF) IDENTIFICATION (RFID) READING PERFORMANCE (71) Applicant: SYMBOL TECHNOLOGIES, LLC, Lincolnshire, IL (US)

(72) Inventor: Richard J. Lavery, Huntington, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/175,372

(22) Filed: Jun. 7, 2016

(51) Int. Cl.
*H04Q 5/22* (2006.01)
*G06K 7/10* (2006.01)

(52) U.S. Cl.
CPC ..... *G06K 7/10198* (2013.01); *G06K 7/10356* (2013.01); *G06K 7/10376* (2013.01); *G06K 7/10425* (2013.01)

(58) Field of Classification Search
CPC .......... G06K 7/10198; G06K 7/10356; G06K 7/10376; G06K 7/10425
USPC .......... 340/572.1–572.9, 5.1–5.5, 10.1–10.5; 235/375–385
See application file for complete search history.

(56) References Cited

U.S. PATENT DOCUMENTS

| 5,029,183 A * | 7/1991 | Tymes | G06K 7/0008 370/338 |
|---|---|---|---|
| 2006/0022815 A1 | 2/2006 | Fischer et al. | |
| 2006/0144940 A1* | 7/2006 | Shannon | G08B 13/2462 235/385 |
| 2008/0143482 A1 | 6/2008 | Shoarinejad et al. | |
| 2008/0186145 A1 | 8/2008 | Manley et al. | |
| 2009/0021343 A1* | 1/2009 | Sinha | H04L 63/1408 340/5.2 |
| 2010/0039228 A1* | 2/2010 | Sadr | G01S 5/12 340/10.1 |
| 2016/0026832 A1* | 1/2016 | Wadman | G06K 17/0029 340/10.1 |

OTHER PUBLICATIONS

International Search Report and Written Opinion for International Patent Application No. PCT/US2017/032112 dated Aug. 16, 2017.

* cited by examiner

*Primary Examiner* — Ojiako Nwugo
(74) *Attorney, Agent, or Firm* — Yuri Astvatsaturov (57) ABSTRACT

Multiple stationary radio frequency (RF) identification (RFID) readers are deployed overhead in a venue and are operated to read RFID tags. A mobile RFID reader is also operated in the venue for reading the RFID tags. The mobile reader is located in the venue, and a host server synchronizes the operation of the stationary readers with the operation of the mobile reader, determines when the mobile reader is in substantially simultaneous, synchronous operation with the stationary readers, and responsively modifies the operation of the stationary and mobile RFID readers to optimize the RFID reading performance.

18 Claims, 7 Drawing Sheets

ARRANGEMENT FOR, AND METHOD OF, OPTIMIZING RADIO FREQUENCY (RF) IDENTIFICATION (RFID) READING PERFORMANCE

BACKGROUND OF THE INVENTION

The present disclosure relates to an arrangement for, and a method of, optimizing radio frequency (RF) identification (RFID) reading performance when reading RFID tags associated with products in a venue in which stationary, overhead RFID readers are deployed and operated substantially simultaneously with one or more handheld, mobile RFID readers.

For product locationing, product tracking, product identification, and inventory control of products associated with radio frequency (RF) identification (RFID) tags in a retail, factory, or warehouse environment, or a like venue, it is known to deploy a plurality of RFID tag readers at stationary, overhead locations in the venue, and then, to operate each such overhead reader, under the control of a network computer or host server, to transmit and receive RF signals over a plurality of reading zones and over a relatively long, reading range, e.g., over twenty feet, to any such tags to read their payloads. A multitude of tags may be in the reading range of each overhead reader. A specific location of any particular RFID-tagged product in the venue is typically determined by having the server process the payloads and capture data from a plurality of the overhead readers by using triangulation/trilateration techniques known in the art.

Although the known overhead readers have been generally satisfactory for reading RFID-tagged products, their reading performance could sometimes suffer and degrade when, for example, multiple RFID-tagged products are stacked closely together, thereby making any one individual product more difficult to isolate and read, and/or are positioned on metal shelving structures, or near walls, of the venue. In such cases, the RF signals are often reflected and/or scattered and/or at least partially absorbed by these structures and/or walls along multiple, folded paths, thereby reducing the capability of the overhead readers of accurately locating the tags. To help alleviate this performance degradation, one or more handheld, user-operated, mobile, RFID tag readers are sometimes used in conjunction with the overhead RFID tag readers. The handheld, mobile readers typically have a shorter reading range, e.g., up to about ten feet, and since they can be brought more closely to, and targeted more directly at, individual RFID-tagged products, a successful reading of each individual RFID-tagged product is more likely, with a lesser likelihood that any RF signal will be reflected and/or scattered and/or at least partially absorbed by walls and/or structures of the venue.

In practice, however, the operation of the mobile readers is independent of, and not synchronized with, the operation of the overhead readers. As a result, simultaneous operation of the mobile readers and of the overhead readers could sometimes interfere with each other, thereby resulting in reduced overall reading performance for both readers.

Accordingly, it would be desirable to optimize RFID reading performance when reading RFID tags associated with products in a venue in which overhead RFID readers are deployed and operated substantially simultaneously with one or more handheld, mobile RFID readers.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for optimizing radio frequency (RF) identification (RFID) reading performance when reading RFID tags associated with products in a venue, such as a retail, factory, or warehouse environment, or any other indoor or outdoor venue. The arrangement includes a sensing system including a plurality of stationary RFID readers deployed overhead in the venue. The stationary readers read the RFID tags over a plurality of RF reading zones in the venue in a stationary reading mode of operation. The arrangement also includes one or more mobile RFID readers operated by a user in the venue. Each mobile reader reads the RFID tags in at least one of the reading zones in a mobile reading mode of operation. A locationing system locates the mobile RFID reader in the at least one reading zone. A host server is operatively connected to the stationary and mobile RFID readers and to the locationing system. The host server synchronizes the operation of the stationary RFID readers with the operation of the located mobile RFID reader, determines when the located mobile RFID reader is in substantially simultaneous, synchronous operation with the stationary RFID readers, and modifies at least one of the modes of operation in response to the determination of the substantially simultaneous, synchronous operation to optimize the reading performance by the stationary and mobile RFID readers.

The located mobile RFID reader has an actuator, e.g., a manually-actuated trigger, for initiating reading when actuated. The host server can detect actuation of the actuator, and then modifies the at least one of the modes of operation in response to detecting the actuation. The host server can replace data read from the RFID tags by the stationary RFID readers with data read from the RFID tags by the located mobile RFID reader. The host server can add data read from the RFID tags by the located mobile RFID reader to data read from the RFID tags by the stationary RFID readers.

Advantageously, each stationary RFID reader includes a plurality of RF antenna elements for reading the tags in the stationary reading mode of operation with a set of reading parameters that include a dwell time of an RF interrogation signal transmitted by the RF antenna elements, a transmit power at which the RF interrogation signal is transmitted by the RF antenna elements, a transmit direction along which the RF interrogation signal is transmitted by the RF antenna elements, and a firing order of a plurality of RF interrogation signals that are transmitted by the RF antenna elements. The host server modifies the at least one mode of operation by changing at least one of the reading parameters.

Preferably, the RFID tags are passive tags, i.e., they have no batteries and receive power from the readers. The stationary RFID readers emit RF interrogation signals that energize and partially power the RFID passive tags, and the mobile RFID reader also emits an RF interrogation signal that energizes and more fully powers the RFID passive tags in the at least one reading zone. The host server controls the stationary and mobile RFID readers to successfully read the RFID passive tags that are powered by the combined operation of the stationary and mobile RFID readers.

A further aspect of this disclosure is directed to a method of optimizing radio frequency (RF) identification (RFID) reading performance when reading RFID tags associated with products in a venue. The method is performed by deploying a plurality of stationary RFID readers overhead in the venue, by reading the RFID tags over a plurality of RF reading zones in the venue in a stationary reading mode of operation of the stationary RFID readers, by operating at least one mobile RFID reader by a user in the venue, by reading the RFID tags in at least one of the reading zones in a mobile reading mode of operation of the at least one mobile RFID reader, by locating the at least one mobile RFID reader in the at least one reading zone in the venue, by synchronizing the operation of the stationary RFID readers with the operation of the at least one located mobile RFID reader, by determining when the at least one located mobile RFID reader is in substantially simultaneous, synchronous operation with the stationary RFID readers, and by modifying at least one of the modes of operation in response to the substantially simultaneous, synchronous operation to optimize the reading performance by the stationary and mobile RFID readers.

In accordance with this disclosure, the operation of the mobile reader is synchronized with the operation of the overhead readers to enhance overall reading performance. For example, since the mobile reader can be brought more closely to, and targeted more directly at, individual RFID-tagged products, a higher confidence may be assigned to the data read by the mobile reader as compared to the data read by the stationary readers. The higher confidence data can replace or supplement the data read by the stationary readers. Upon the determination that the stationary and mobile readers are in substantially simultaneous, synchronous operation, one or more reading parameters of the stationary mode and/or of the mobile mode of operation may be varied, thereby optimizing the overall reading performance.

Figure 1:
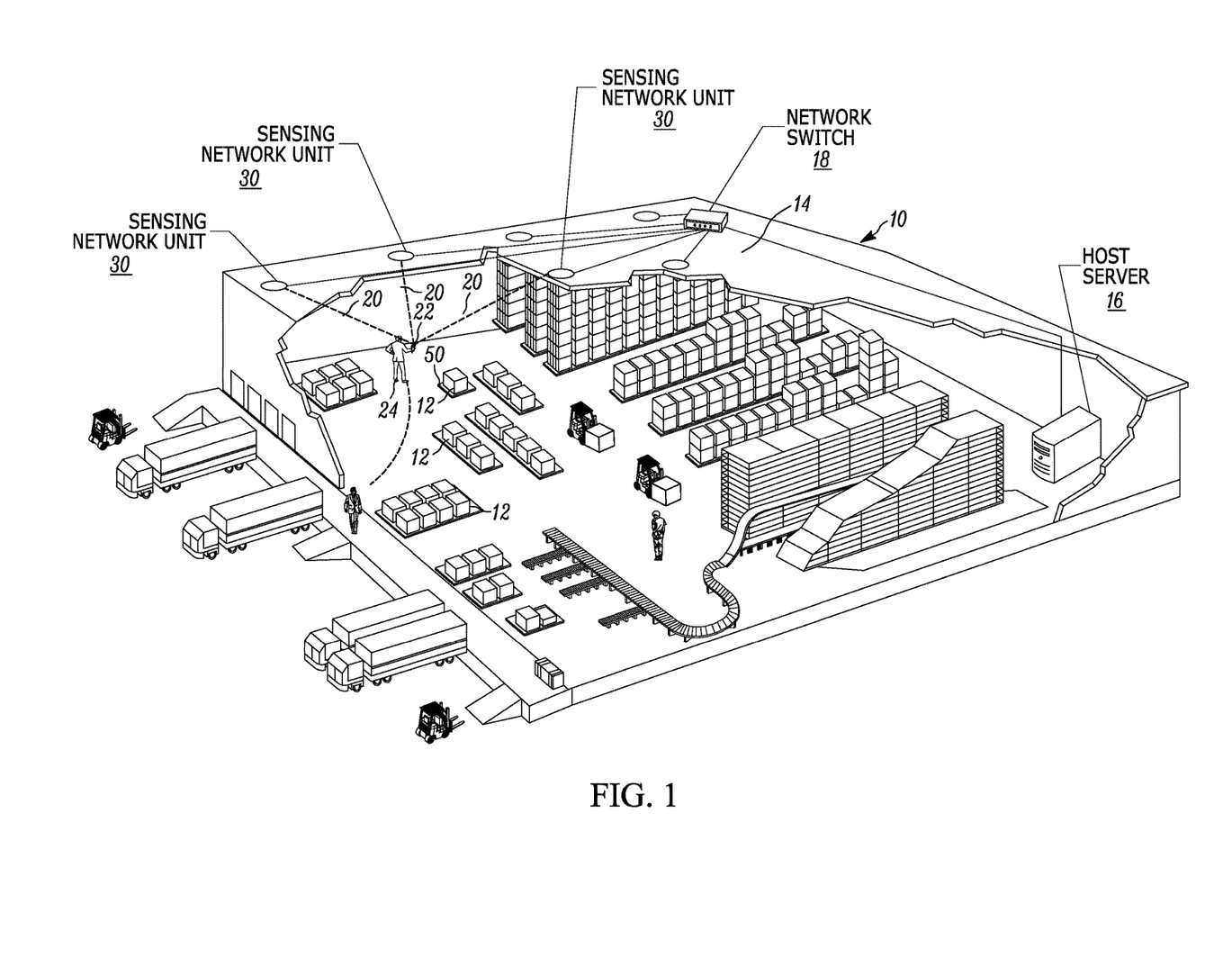
FIG. 1 is a broken-away, perspective view, as seen from above, of an arrangement for optimizing RFID reading performance when reading RFID tags associated with products in a venue in which overhead sensing units having RFID readers are deployed and operated substantially simultaneously with at least one handheld, mobile RFID reader in accordance with the present disclosure.
Figure 3:
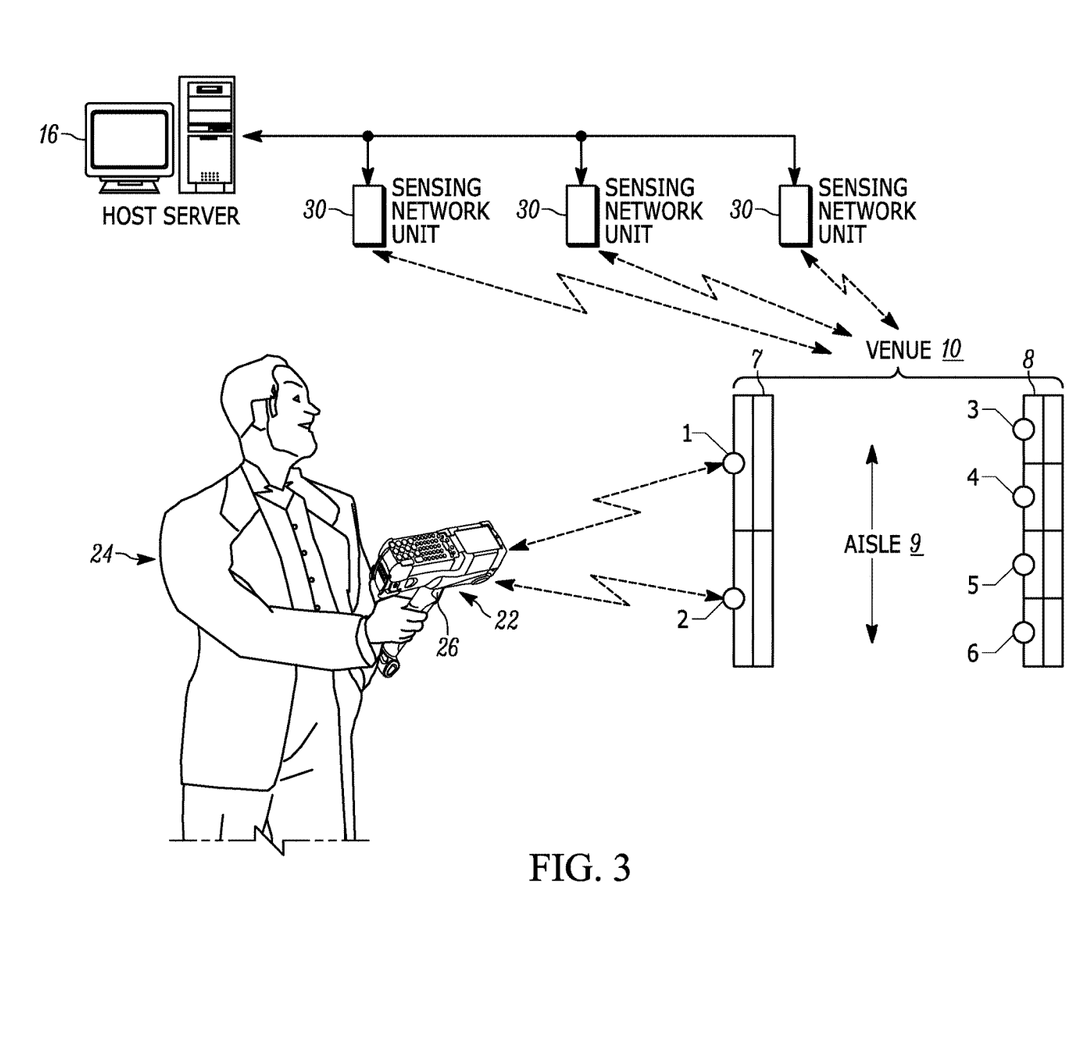
FIG. 3 is a view depicting a user operating a mobile RFID reader to read product tags in the venue in which the product tags are also read by the overhead readers in the sensing network units of FIG. 1.
Figure 5:
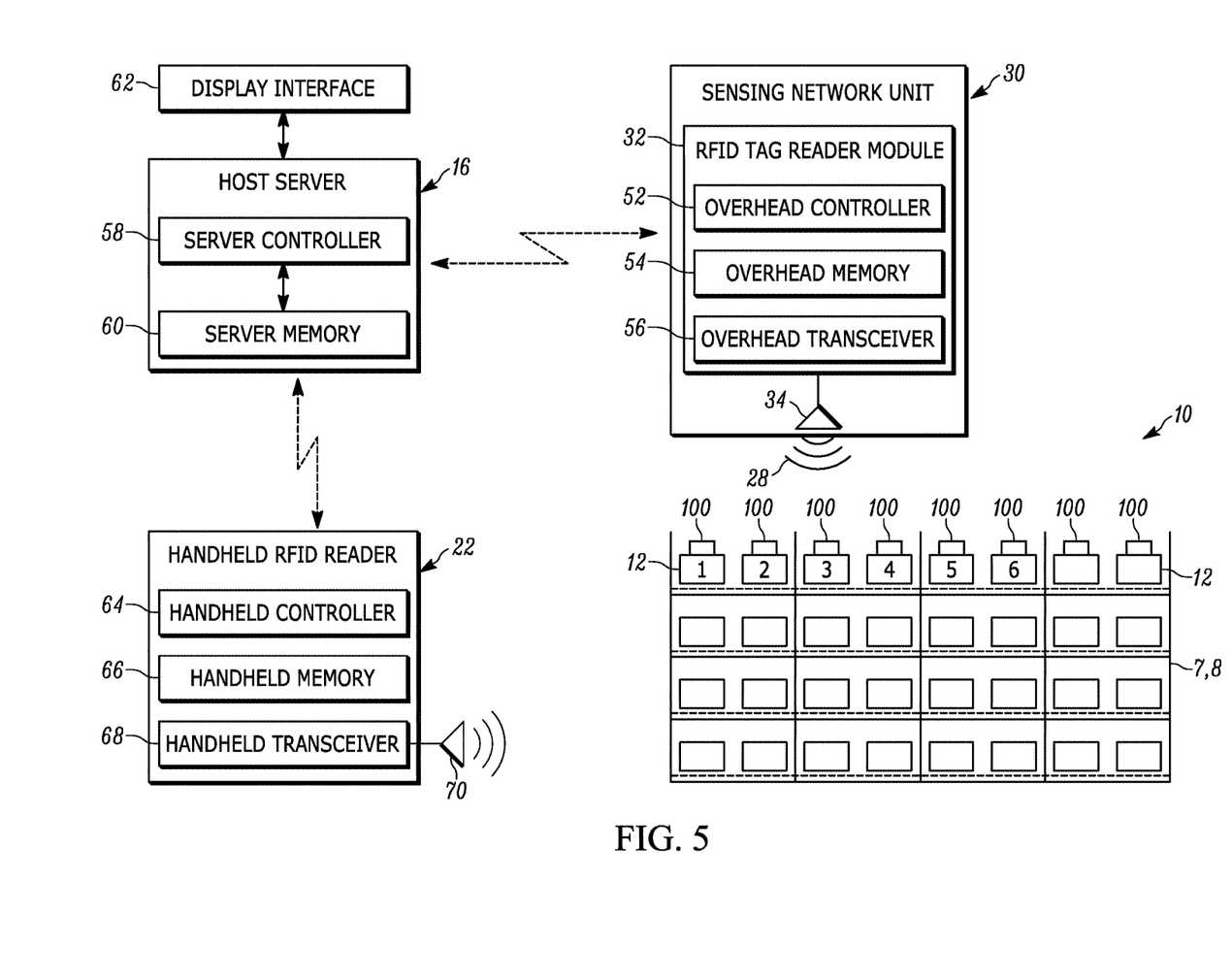
FIG. 5 is an overall system block diagram of a host server, a representative overhead reader, and a mobile reader to optimally read RFID tags.

Turning now to the drawings, reference numeral 10 in FIG. 1 generally depicts a warehouse environment or venue in which products 12, shown in FIG. 1 as cuboid cartons for simplicity, are to be accurately located in accordance with this disclosure. The venue 10 may be any indoor or outdoor venue, and may have any layout or configuration. As shown in FIG. 3, the venue 10 may have, for example, a plurality of shelving structures 7 and 8 separated by an aisle 9 in the venue 10, and a plurality of the products 12, also identified by numerals 1-2, can be mounted on the shelving structure 7, and a plurality of others of the products 12, also identified by numerals 3-6, can be mounted on the shelving structure 8. As shown in FIG. 5, each product 12 is preferably tagged with a radio frequency (RF) identification (RFID) product tag 100, preferably a passive RFID tag for cost reasons, and, in some applications, each RFID product tag 100 may be associated with a pallet 50 (see FIG. 1 or 6), or a container, for supporting multiple products 12.

As also shown in FIG. 1, a plurality of sensing network units 30 is deployed in the venue 10 and is stationarily and fixedly mounted overhead, for example, on, or adjacent to, a ceiling 14. Advantageously, as shown in the overhead view of FIG. 4, the sensing network units 30 can be installed every twenty to eighty feet or so in a grid pattern. A network computer or host server 16, typically locally located in a backroom at the venue 10, comprises one or more computers and is in wired, wireless, direct, or networked communication with each sensing network unit 30 through a network switch 18. The server 16 may also be remotely hosted in a cloud server. The server 16 may include a wireless RF transceiver that communicates with each sensing network unit 30. For example, Wireless Fidelity (Wi-Fi) and Bluetooth® are open wireless standards for exchanging data between electronic devices. The server 16 controls each sensing network unit 30. As shown in FIG. 5, the server 16 includes a controller 58 and a memory 60, and may also have a display interface 62.

Figure 2:
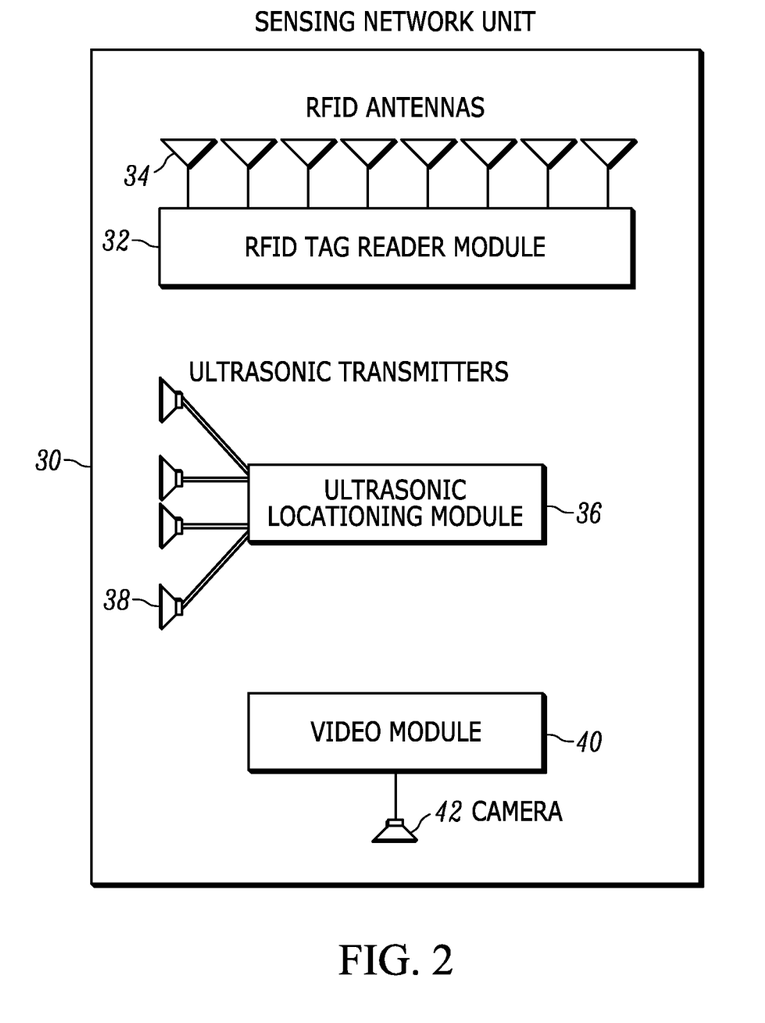
FIG. 2 is a block diagram of various sensing systems that could be installed in one of the sensing network units of FIG. 1.

The block diagram of FIG. 2 depicts various sensing systems that can be mounted in each overhead sensing network unit 30. One of these sensing systems is a radio frequency (RF) identification (RFID) tag reader operative for reading the tags 100 over a corresponding plurality of coverage ranges or reading zones 92, 94, 96, 98 (see FIG. 4). More particularly, each overhead RFID reader includes an RFID tag reader module 32 that has, as shown in FIG. 5, a controller 52, a memory 54, and an RF transceiver 56, which are operatively connected to a plurality of RFID antenna elements 34, which are energized by the RFID module 32 to radiate an RF beam 28 (see also FIG. 6) over an antenna field pattern. The RF transceiver 56 is operated, under the control of the controller 52 and/or the controller 58, to transmit RF beams 28 to the tags 100, and to receive RF response signals from, the tags 100, thereby interrogating and processing the payloads of the tags 100 that are in its reading zone 92, 94, 96, or 98. The payload or captured target data identifies the tags 100 and their associated products. As shown in FIG. 3, the server 16 controls the overhead RFID readers in the plurality of sensing network units 30 to read the tags 100 on the products 1-6 in a stationary reading mode of operation in accordance with a set of reading parameters stored in the memories 54 and/or 60, as described below.

As further shown in FIGS. 1 and 3, a user 24 holds, carries, and operates a handheld, portable, mobile RFID tag reader during his/her movement within the venue 10. As shown in FIG. 5, the mobile reader 22 has a controller 64, a memory 66, and an RF transceiver 68 operatively connected to an RFID antenna 70. The controllers 58 and/or 64 control the mobile reader 22 to read the product tags 100 associated with the products 12 in the venue 10 in at least one of the reading zones 92, 94, 96, or 98 in a mobile reading mode of operation in accordance with a set of reading parameters stored in the memories 60 and/or 66, as described below. The user 24 is any person, employee, operator, or associate authorized to operate the handheld, mobile reader 22. To initiate reading, the user manually actuates an actuator or trigger 26 on the mobile reader 22. More than one mobile reader 22 may be present and movable in the venue 10.

In accordance with this disclosure, the operation of the stationary, overhead RFID readers is synchronized by the host server 16, preferably, on a time-shared basis, with the operation of the mobile RFID reader. The operation of the stationary, overhead RFID readers is typically continuous, while the operation of the mobile RFID reader is typically only initiated upon actuation of the trigger 26. Typically, the synchronization is performed in accordance with the Network Time Protocol (NTP). The server 16 can schedule, or coordinate, the data read by the mobile reader 22 with the data read by the overhead readers. A locationing system is provided for locating the mobile RFID reader 22 in at least one reading zone in the venue 10, and the host server 16 determines when the located mobile RFID reader 22 is in substantially simultaneous, synchronous operation with the stationary RFID readers, and modifies at least one of the modes of operation in response to the determination of the substantially simultaneous, synchronous operation to optimize the reading performance by the stationary and mobile RFID readers.

The locationing system is advantageously mounted in each overhead sensing network unit 30. Returning to FIG. 2, another of the sensing systems is an ultrasonic locationing system operative for locating the mobile reader 22 by transmitting an ultrasonic signal to an ultrasonic receiver, e.g., a microphone, on the mobile reader 22. More particularly, the locationing system includes an ultrasonic locationing module 36 having control and processing electronics operatively connected to a plurality of ultrasonic transmitters, such as voice coil or piezoelectric speakers 38, for transmitting ultrasonic energy to the microphone on the mobile reader 22. The receipt of the ultrasonic energy at the microphone locates the mobile reader 22. Each ultrasonic speaker 38 periodically transmits ultrasonic ranging signals, preferably in short bursts or ultrasonic pulses, which are received by the microphone on the mobile reader 22. The microphone determines when the ultrasonic ranging signals are received. The locationing module 36, under the control of the server 16, directs all the speakers 38 to emit the ultrasonic ranging signals such that the microphone on the mobile reader 22 will receive minimized overlapping ranging signals from the different speakers 38. The flight time difference between the transmit time that each ranging signal is transmitted and the receive time that each ranging signal is received, together with the known speed of each ranging signal, as well as the known and fixed locations and positions of the speakers 38 on each sensing unit 30, are all used to determine the position of the microphone and of the mobile reader 22, using a suitable locationing technique, such as triangulation, trilateration, multilateration, etc, as diagrammatically shown by dashed lines 20 in FIG. 1.

Another sensing system that could be used to locate the mobile reader 22 is a Wireless Fidelity (Wi-Fi) system operative for locating the mobile reader 22 by transmitting multiple Wi-Fi signals to a Wi-Fi receiver in the mobile reader 22. More particularly, the Wi-Fi system is mounted in each sensing network unit 30 and includes a Wi-Fi network module having control and processing electronics operatively connected to a Wi-Fi antenna. Each Wi-Fi signal is transmitted to the Wi-Fi receiver in the mobile reader 22. The receipt of multiple Wi-Fi signals from multiple Wi-Fi systems at the Wi-Fi receiver locates the mobile reader 22, as diagrammatically shown by the dashed lines 20 in FIG. 1.

Still another sensing system that could be used to locate the mobile reader 22 is a Bluetooth Low Energy (BLE) system for locating the mobile reader 22 by transmitting multiple BLE signals to a BLE receiver in the mobile reader 22. More particularly, the BLE system is mounted in each sensing network unit 30 and includes a BLE network module having control and processing electronics operatively connected to a BLE antenna. Each BLE signal is transmitted to the BLE receiver in the mobile reader 22. The receipt of multiple BLE signals from multiple BLE systems at the BLE receiver locates the mobile reader 22, as diagrammatically shown by the dashed lines 20 in FIG. 1.

Yet another sensing system that could be used to locate the mobile reader 22 is a video system operative for locating the mobile reader 22 by capturing an image of the mobile reader 22. More particularly, the video system is mounted in each sensing network unit 30 and includes a video module 40 having camera control and processing electronics that is connected to a camera 42 for capturing the image of the mobile reader 22. The camera 50 is advantageously a high-bandwidth, moving picture expert group (MPEG) compression camera. The capture of the image by the camera 42 is processed by the server 16 to locate the mobile reader 22.

Figure 4:
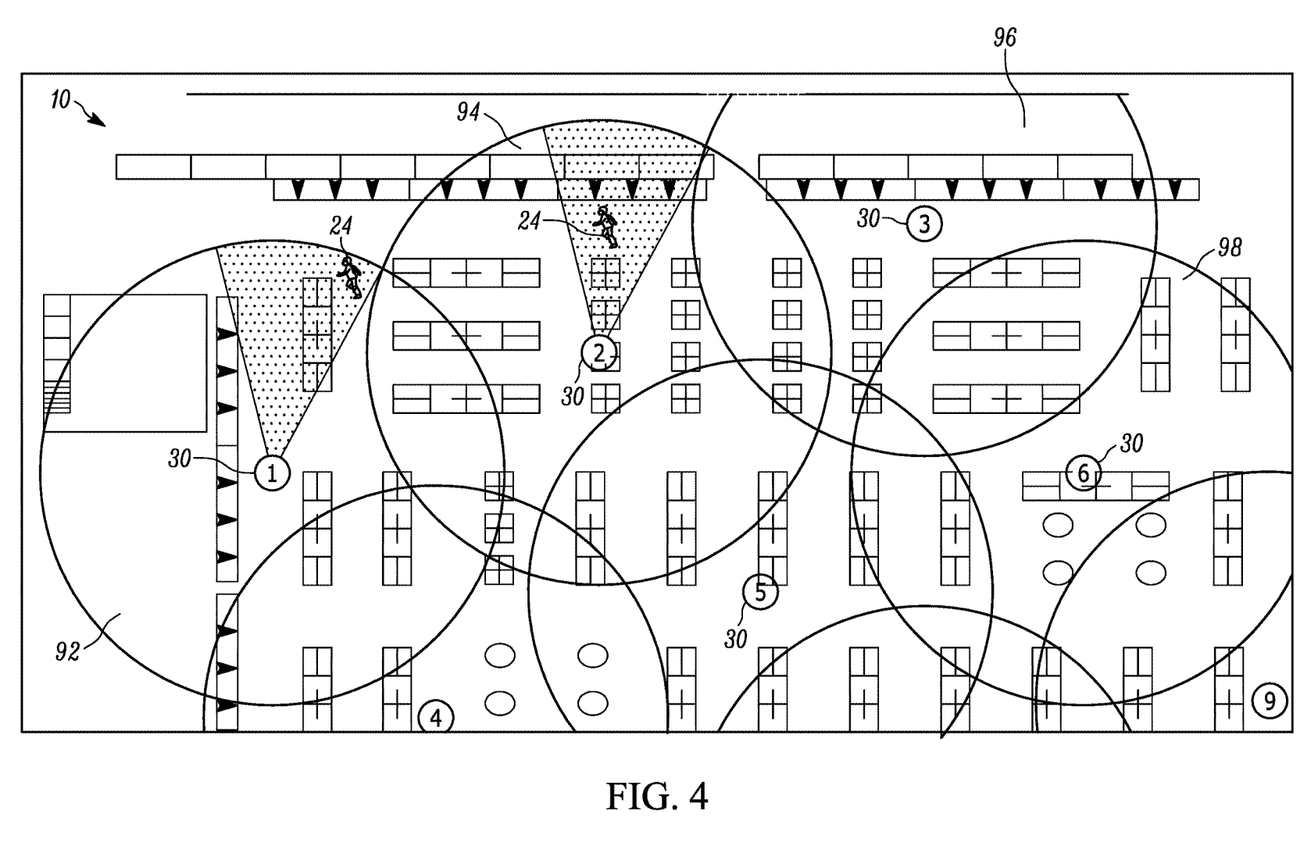
FIG. 4 is a diagrammatic top plan view depicting reading zones of the overhead readers in the sensing network units of FIG. 1.

Once the mobile reader 22 has been located in at least one of the reading zones, e.g., zones 92 or 94 in FIG. 4, also sometimes referred to herein as zones of interest, in contrast to zones 96 and 98 where the mobile reader 22 is not present, and are therefore sometimes referred to herein as zones of no or little interest, the host server 16 determines when the located mobile RFID reader 22 is in substantially simultaneous, synchronous operation with the stationary RFID readers, and modifies the aforementioned stationary mode of operation and/or the aforementioned mobile mode of operation in response to the determination of the substantially simultaneous, synchronous operation. For example, the host server 16 may detect actuation of the trigger 26, and can responsively modify one or more of the aforementioned modes of operation. As other examples, due to the above-described higher confidence assigned to data read by the mobile reader 22, the host server 16 may modify one or more of the modes of operation by replacing data read from the RFID tags 100 by the stationary RFID readers with data read from the RFID tags 100 by the located mobile RFID reader 22, or by adding data read from the RFID tags 100 by the located mobile RFID reader 22 to data read from the RFID tags 100 by the stationary RFID readers.

Preferably, the RFID tags 100 are passive tags, i.e., they have no batteries and receive power from the readers. The stationary RFID readers emit RF interrogation signals that energize and partially power the RFID passive tags 100. If the tags 100 are located very far away from the stationary RFID readers, the tags 100 might not receive sufficient power to respond to the interrogation signals, in which case, these remote tags 100 might not be read, or at least not reliably. The mobile RFID reader 22 also emits an RF interrogation signal that energizes and powers the RFID passive tags. Since the mobile RFID reader 22 is typically closer to the tags 100, the tags 100 will likely receive sufficient power to respond to the interrogation signals just emitted by the mobile reader 22, but even if not, the simultaneous operation of the mobile and stationary readers will together likely provide sufficient power for the tags 100 to respond to the interrogation signals. The host server 16 controls the stationary and mobile RFID readers to successfully read the RFID passive tags 100 that are powered by the combined operation of the stationary and mobile RFID readers.

Figure 6:
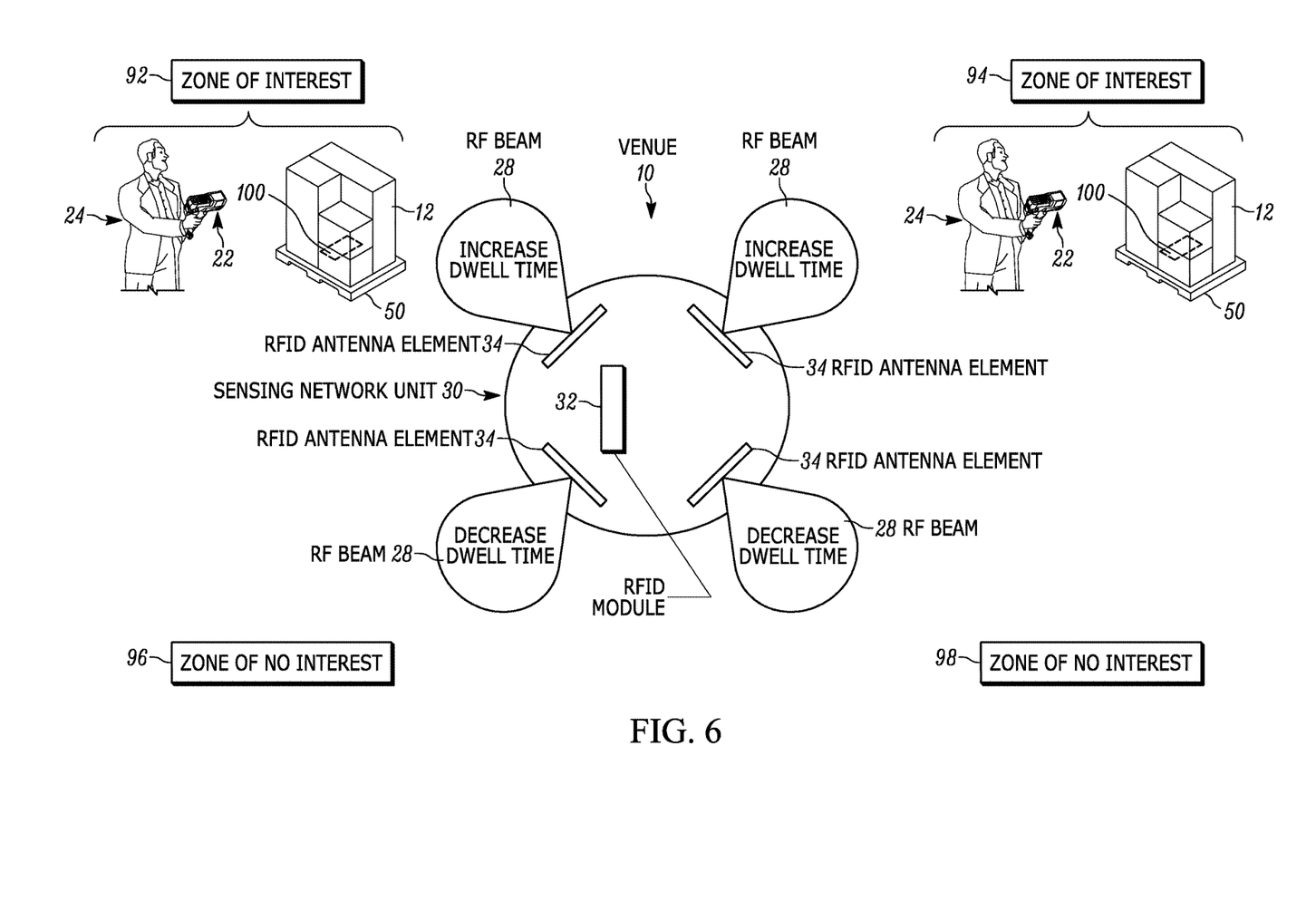
FIG. 6 is a diagrammatic top plan view depicting one example of how the performance of an overhead RFID reader at a representative sensing network unit can be optimized by a mobile RFID reader.

As shown in FIG. 6, the overhead RFID reader in each sensing network unit 30 initially reads the RFID product tags 100 in a stationary mode of operation with a set of reading parameters or settings. One such reading parameter is the duration of a dwell time of an RF interrogation signal transmitted by each antenna element 34 of the overhead RFID reader. The dwell time is the length of time that an RFID product tag 100 stays in the field of the RF interrogation beam 28. The RFID module 32 varies the dwell time, or any other reading parameter or setting, after the server 16 has determined that the located mobile RFID reader 22 is in substantially simultaneous, synchronous operation with the stationary overhead readers in the zones of interest 92, 94. The RFID module 32, under the control of the server 16, will then directly proportionately increase the dwell time, or adjust any other reading parameter, and vice versa, to concentrate and target the RFID reading operation to read those RFID product tags 100 that are in that zone 92 or 94 of interest, and not to direct its reading operation, or at least not to fully direct its reading operation, to product tags 100 in other zones, i.e., zones 96 or 98 that are currently of no or little interest.

Other reading parameters that can be changed by the server 16 include, but are not limited to, a transmit power at which the RF signals are transmitted by the RF antenna elements 34, and/or a transmit direction along which the RF signals are transmitted by the RF antenna elements 34, and/or a firing order of a plurality of RF signals that are transmitted by the RF antenna elements 44. Any one or more of such reading parameters can be varied by the server 16 in any combination.

Figure 7:
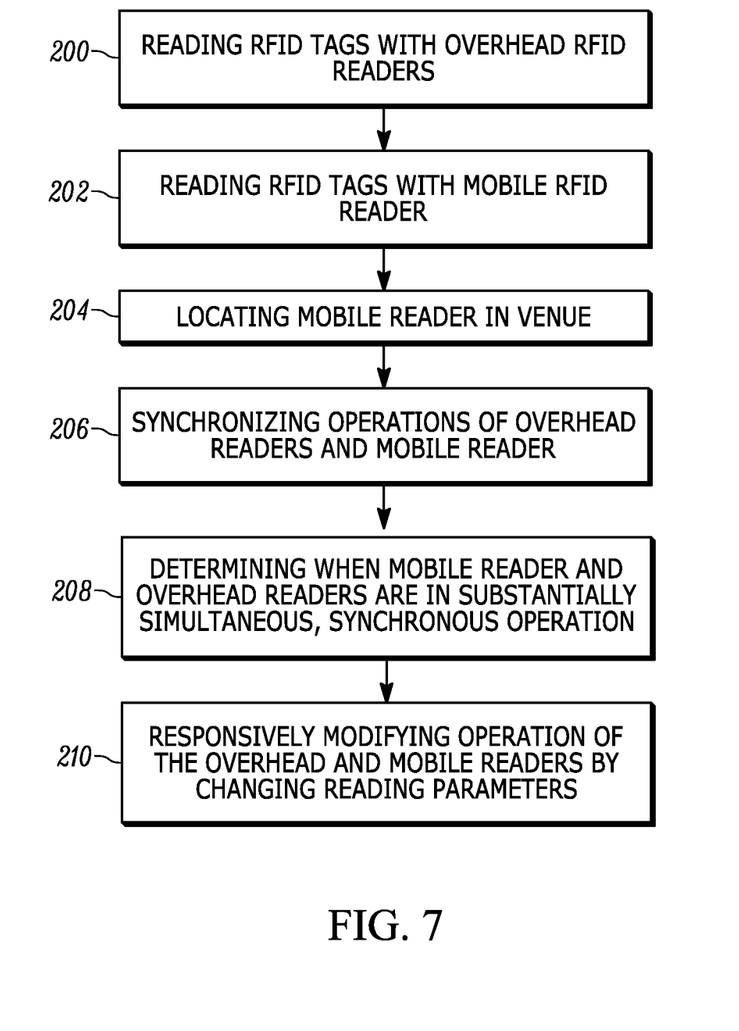
FIG. 7 is a flow chart of a method of optimizing RFID reading performance in accordance with the present disclosure.

The flow chart of FIG. 7 depicts the operation of the method of this disclosure. In step 200, a plurality of overhead RFID readers deployed in the venue 10 is continuously operated by the host server 16 to read the RFID tags 100 over a plurality of RF reading zones 92, 94, 96, 98 in a stationary reading mode of operation of the overhead RFID readers. In step 202, a mobile RFID reader 22 is non-continuously operated by a user 24 in the venue to read the RFID tags 100 in at least one of the reading zones, e.g., zones of interest 92, 94 in a mobile reading mode of operation. In step 204, a locationing system locates the mobile RFID reader 22 in a zone of interest 92, 94. In step 206, the server 16 synchronizes the operation of the overhead RFID readers with the operation of the mobile RFID reader 22. In step 208, the server 16 determines when the mobile RFID reader 22 is in substantially simultaneous, synchronous operation with the overhead RFID readers. In step 210, the server 16 modifies the stationary and/or the mobile modes of operation by changing one or more of their reading parameters in response to the determining of the substantially simultaneous, synchronous operation to optimize the reading performance by the overhead and mobile RFID readers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A reader or structure that is "configured" in a certain way is configured in at least that way, but may also be configured in ways that are not listed.

It will be appreciated that some embodiments may be comprised of one or more generic or specialized processors (or "processing readers") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage reader, a magnetic storage reader, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for optimizing radio frequency (RF) identification (RFID) reading performance when reading RFID tags associated with products in a venue, the arrangement comprising:
 a sensing system including a plurality of stationary RFID readers deployed overhead in the venue, and operative for reading the RFID tags over a plurality of RF reading zones in the venue in a stationary reading mode of operation;
 at least one mobile RFID reader operated by a user in the venue, and operative for reading the RFID tags in at least one of the reading zones in a mobile reading mode of operation;
 a locationing system for locating the at least one mobile RFID reader in the at least one reading zone in the venue; and
 a host server operatively connected to the stationary and mobile RFID readers and to the locationing system, and operative for synchronizing the operation of the stationary RFID readers with the operation of the at least one located mobile RFID reader, for determining when the at least one located mobile RFID reader is in substantially simultaneous, synchronous operation with the stationary RFID readers, and for modifying at least one of the modes of operation in response to the determination of the substantially simultaneous, synchronous operation to optimize the reading performance by the stationary and mobile RFID readers.

2. The arrangement of claim 1, wherein the at least one mobile located RFID reader has an actuator for initiating reading when actuated; and wherein the host server is operative for detecting actuation of the actuator, and for modifying the at least one of the modes of operation in response to detecting the actuation.

3. The arrangement of claim 1, wherein the host server is operative for replacing data read from the RFID tags by the stationary RFID readers with data read from the RFID tags by the at least one located mobile RFID reader.

4. The arrangement of claim 1, wherein the host server is operative for adding data read from the RFID tags by the at least one located mobile RFID reader to data read from the RFID tags by the stationary RFID readers.

5. The arrangement of claim 1, wherein each stationary RFID reader includes a plurality of RF antenna elements for reading the tags in the stationary reading mode of operation with a set of reading parameters that include a dwell time of an RF interrogation signal transmitted by the RF antenna elements, a transmit power at which the RF interrogation signal is transmitted by the RF antenna elements, a transmit direction along which the RF interrogation signal is transmitted by the RF antenna elements, and a firing order of a plurality of RF interrogation signals that are transmitted by the RF antenna elements; and wherein the host server modifies the at least one mode of operation by changing at least one of the reading parameters.

6. The arrangement of claim 1, wherein the RFID tags are passive tags, and wherein the stationary RFID readers emit RF interrogation signals that energize and partially power the RFID passive tags, and wherein the at least one located mobile RFID reader also emits an RF interrogation signal that energizes and more fully powers the RFID passive tags in the at least one reading zone, and wherein the host server controls the stationary and mobile RFID readers to successfully read the RFID passive tags that are powered by the combined operation of the stationary and mobile RFID readers.

7. The arrangement of claim 1, wherein the at least one mobile RFID reader includes an RF receiver, and wherein the locationing system is one of an ultrasonic locationing system, a Wireless Fidelity (Wi-Fi) system, and a Bluetooth Low Energy (BLE) system, each operative for locating the at least one mobile RFID reader by transmitting an RF signal to the RF receiver on the at least one mobile RFID reader.

8. The arrangement of claim 1, wherein the locationing system is a video system operative for locating the at least one mobile RFID reader by capturing an image of the at least one mobile RFID reader.

9. The arrangement of claim 1, wherein the host server synchronizes the operation of the stationary RFID readers with the operation of the at least one located mobile RFID reader on a time-shared basis.

10. A method of optimizing radio frequency (RF) identification (RFID) reading performance when reading RFID tags associated with products in a venue, the method comprising:
 deploying a plurality of stationary RFID readers overhead in the venue;
 reading the RFID tags over a plurality of RF reading zones in the venue in a stationary reading mode of operation of the stationary RFID readers;
 operating at least one mobile RFID reader by a user in the venue;
 reading the RFID tags in at least one of the reading zones in a mobile reading mode of operation of the at least one mobile RFID reader;
 locating the at least one mobile RFID reader in the at least one reading zone in the venue;
 synchronizing the operation of the stationary RFID readers with the operation of the at least one located mobile RFID reader;

determining when the at least one located mobile RFID reader is in substantially simultaneous, synchronous operation with the stationary RFID readers; and modifying at least one of the modes of operation in response to the determining of the substantially simultaneous, synchronous operation to optimize the reading performance by the stationary and mobile RFID readers.

11. The method of claim 10, and initiating reading of the at least one located mobile RFID reader by actuating an actuator, detecting actuation of the actuator, and modifying the at least one of the modes of operation in response to detecting the actuation.

12. The method of claim 10, and replacing data read from the RFID tags by the stationary RFID readers with data read from the RFID tags by the at least one located mobile RFID reader.

13. The method of claim 10, and adding data read from the RFID tags by the at least one located mobile RFID reader to data read from the RFID tags by the stationary RFID readers.

14. The method of claim 10, and configuring each stationary RFID reader to include a plurality of RF antenna elements for reading the tags in the stationary reading mode of operation with a set of reading parameters that include a dwell time of an RF interrogation signal transmitted by the RF antenna elements, a transmit power at which the RF interrogation signal is transmitted by the RF antenna elements, a transmit direction along which the RF interrogation signal is transmitted by the RF antenna elements, and a firing order of a plurality of RF interrogation signals that are transmitted by the RF antenna elements; and wherein the modifying of the at least one mode of operation is performed by changing at least one of the reading parameters.

15. The method of claim 10, and configuring the RFID tags as passive tags, and emitting from the stationary RFID readers a plurality of RF interrogation signals that energize and partially power the RFID passive tags, and emitting from the at least one located mobile RFID reader an RF interrogation signal that energizes and more fully powers the RFID passive tags in the at least one reading zone, and controlling the stationary and mobile RFID readers to successfully read the RFID passive tags that are powered by the combined operation of the stationary and mobile RFID readers.

16. The method of claim 10, and configuring the at least one mobile RFID reader with an RF receiver, and wherein the locating of the at least one mobile RFID reader is performed by transmitting an RF signal to the RF receiver on the at least one mobile RFID reader.

17. The method of claim 10, wherein the locating of the at least one mobile RFID reader is performed by capturing an image of the at least one mobile RFID reader.

18. The method of claim 10, wherein the synchronizing of the operation of the stationary RFID readers with the operation of the at least one located mobile RFID reader is performed on a time-shared basis.

\* \* \* \* \*